United States Patent Office 3,155,719
Patented Nov. 3, 1964

3,155,719
OXIDATION OF ALDEHYDES TO CARBOXYLIC ACIDS USING A CATALYST COMPRISING COBALT NAPHTHENATE AND A COBALT CHELATE
Adolph C. Shotts, Maplewood, La., and Jesse R. Motes, Lubbock, Tex., assignors to Cities Service Research & Development Company, New York, N.Y., a corporation of New Jersey
No Drawing. Filed Dec. 14, 1960, Ser. No. 75,691
6 Claims. (Cl. 260—530)

This invention relates to processes for the preparation of carboxylic acids from aldehydes by oxidizing an aldehyde in the presence of a catalyst comprising organic cobalt compounds having only ordinary valence bonds and chelates of cobalt. In particular, carboxylic acid salts of cobalt in combination with organic chelates of cobalt are the catalysts employed in the invention, and the reaction is conducted in the liquid phase.

Numerous methods are recognized in the prior art for preparing carboxylic acids from their corresponding aldehydes. Liquid phase reactions include the utilization of molecular oxygen in the presence of an oxidation catalyst. Another method involves the mechanism of hydration and dehydrogenation of the aldehyde, in the presence of water. Vapor phases processes are known in which the vaporized aldehyde, with or without the introduction of oxygen, is contacted with a solid catalyst. Prior catalysts include various organic and inorganic compounds of metals used singly and in various combinations.

Organic acids having $\alpha,\beta$-unsaturation and derived from their corresponding $\alpha,\beta$-unsaturated aldehydes are particularly difficult to prepare in good yields. One problem encountered with these aldehydes and acids is polymerization through the olefinic unsaturation. Another problem encountered is that of side reactions of or degradation of the materials present during the reaction, with the result that less desirable by-products are formed. Where conditions have been used to avoid substantial polymerization and degradation, yields have often been low.

It has now been found that there is a synergistic effect, upon the reaction involving the conversion of aldehydes to acids, as between certain organic compounds of cobalt. At least one of the compounds is soluble, in the amount used, the solubility being with reference to the reaction mixture containing the $\alpha,\beta$-unsaturated aldehyde. An example of a compound of cobalt having only ordinary valence bonds from the cobalt atom to the remainder of the molecule is found in certain carboxylic acid salts of the metal such as cobalt naphthenate. The other compound of the combination is a cobalt chelate. A specific example of a chelate is cobalt acetylacetonate.

While the invention is valuable for oxidizing aldehydes in general to obtain carboxylic acids therefrom, it is of particular value for preparing unsaturated acids from the corresponding unsaturated aldehydes. Saturated aldehydes such as acetaldehyde, propionaldehyde, butyraldehyde, glyoxal, glutaric dialdehyde, and homologues having up to about 10 non-oxo carbon atoms are within the invention, as are aryl aldehydes such as vanillin, benzaldehyde, toluic aldehydes, chlorobenzaldehydes, and homologues thereof.

The preferred aldehydes used in the invention are olefinically $\alpha,\beta$-unsaturated aldehydes corresponding to the formula:

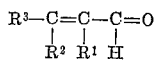

wherein $R^1$, $R^2$, and $R^3$ may be the same or different and are radicals selected from the group consisting of hydrogen, alkyl, and aryl. Thus, the radicals $R^1$, $R^2$, and/or $R^3$ may be hydrogen, halogen, methyl, ethyl, propyl, butyl, amyl, isopropyl, isobutyl, phenyl, tolyl, biphenyl, benzyl, or naphthyl, for example. Preferably, acrylic aldehyde or $\alpha$-methylacrylic aldehyde is utilized (hereinafter called acrolein and methacrolein). Other useful aldehydes include crotonic, isocrotonic, $\alpha$-chloroacrylic $\beta$-ethylacrylic, isohydrosorbic, $\beta,\beta$-dimethylacrylic, and cinnamic aldehydes. As may be seen, the preferred radicals are alkyl groups having five or less carbon atoms, hydrogen, and aryl groups having a single benzene ring, unsubstituted, or less preferably substituted with one or more alkyl radicals or having two benzene rings. However, still other $\alpha,\beta$-unsaturated aldehydes comprehended by the above formula are useful. For instance, the radicals $R^1$, $R^2$ and $R^3$ may be selected from those radicals "R" disclosed by Groll et al. in United States Patent No. 2,212,900. Wherever reference is made to aldehydes or acids of this class which are readily polymerized, the meaning is that in the above formula, or in a similar formula for the corresponding acid, at least two of the radicals $R^1$, $R^2$ and $R^3$ are hydrogen.

The preferred catalytic cobalt chelate "salts" are derived from $\beta$-ketones having the formula:

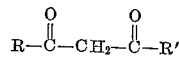

wherein R is a hydrocarbon radical such as alkyl, cycloalkyl, aryl, or a substituted derivative thereof, and R' is radical such as a hydrocarbon radical similar to R, or a substituted derivative thereof. When R' is a hydrocarbon radical, it may be the same as the radical R or different therefrom; the resulting $\beta$-diketones are the preferred $\beta$-ketones. Suitable alkyl radicals are methyl, ethyl, propyl, isopropyl, butyl and hexyl. Representative cycloalkyl radicals are cyclopentyl, cyclohexyl, methyl cyclohexyl, and ethyl cyclopentyl. Examples of aryl radicals are phenyl, benzyl, tolyl, naphthyl and similar radicals. The preferred $\beta$-diketone is acetylacetone. As may be seen, the hereinbefore described compounds which form organochelates of cobalt are those which contain up to about 23 carbon atoms, the cobalt atom being chelated by means of both coordinate and ordinary valence bonds. The term "chelate" is used in the usual sense, as defined more particularly by Moeller, Inorganic Chemistry, pp. 237–242 (1952).

The non-chelate catalytic compounds are cobalt salts derived from acids comprising those having the formula $R(CH_2)_xCOOH$ wherein $x$ is 0 or a small whole number, e.g., 1 to 10, and R is a cycloalkyl radical having 5 or 6 carbon atoms in the ring, with or without alkyl side chains on the ring. As may be seen, these cycloalkyl carboxylic acids include those which have from about 6 carbon atoms to about 17 carbon atoms. Double ring naphthenic acids are also useful. These acids and homologues and analogues thereof, particularly in admixtures available commercially, are known as "naphthenic acid"; see for example Kirk and Othmer, Encyclopedia of Chemical Technology 9, 241–247, Interscience (1952).

As may be seen, in both the preferred non-chelate organocobalt component and the preferred cobalt chelate component, the cobalt atoms are bonded to at least one carbon atom by means of at least one oxygen atom through ordinary valence bonds.

Polymerization inhibitors such as sulfur or metallic copper may be present during the reaction although they are not necessary. The reaction product may be treated with known polymerization inhibitors such as phenolic compounds, of the types known to be useful in this regard.

Oxygen gas is the preferred oxidizing means although other known processes of converting an aldehyde to the corresponding acid may be benefited by using the catalyst composition according to this invention. Air is included by the phrases "oxygen-containing gas" and "oxygen gas," as are relatively pure oxygen gas and other oxygen-containing gases. Where use is made of an organic solvent, it should be relatively free of water. The solvent may be treated with desiccants to remove water, and other impurities may be removed if desired.

Solvents which are useful include various classes of compounds including hydrocarbons, halogenated hydrocarbons, carboxylic acids, alcohols, ethers, amines, esters, and other inert solvents. By the expression "inert" the meaning intended is that the solvent is inert under the conditions used. Thus, conditions should be chosen to avoid formation of acetals or esters, where alcohols are used as a solvent. Similar consideration apply to the use of other solvents which could be reactive under certain conditions. Another desirable quality of the solvent is that it be easily separable from the reaction mixture and components thereof including the aldehyde starting material and the acid product. Suitable solvents include benzene, toluene, p-xylene, o-xylene, m-xylene, toluene, hexane, cyclohexane, ethylcyclohexane, petroleum ether, chlorobenzene, carbon tetrachloride, chloroform, acetone, ethyl acetate, butyl acetate, ethylene diamine, ethanol, propanol, butanol, acetic acid, ethylene glycol, glycerol, furfuryl alcohol, dioxane, and other organic solvents. Mixtures of solvents may be used. With some liquid aldehydes, solvents are not essential, particularly if one or both of the catalyst components is soluble in the aldehyde.

The preferred mode of conducting the reaction is in the liquid phase in which the aldehyde is dissolved in an inert organic solvent, the concentration of aldehyde by weight in the mixture being between about 10% and 75%, the reaction being conducted at a temperature between about 0° C. and 100° C., the ratio of the non-chelate cobalt compound to the cobalt chelate being between about 1 to 10 and 10 to 1, and in which the two catalyst components, together, comprise at least about 0.005% by weight of the aldehyde. The ratios between the two catalyst components may be higher and lower than that given above, for example between about 1 to 100 and 100 to 1, although this may necessitate using a larger amount of the combined weight of the two components. Higher and lower concentrations of the aldehyde may be used, but at concentrations lower than 10% economic factors tend to discourage utilization of this concentration and at concentrations of above 75%, polymerization readily occurs with certain of the aldehydes and/or acids, and accordingly a smaller proportion of the aldehyde is considered to be more practicable. The preferred concentration of aldehyde based on the weight of the aldehyde-solvent mixture is between about 20% and 60%. Intimate contact of the aldehyde and catalyst components is obtained by commingling them, as by vigorous agitation. The catalyst components should be finely divided, suitable particle sizes being from approximately 20 mesh to 300 mesh, U.S. Sieve Series. The components may be dissolved or suspended before introduction into the reaction zone.

The temperature is not particularly critical except that it is kept below the boiling point of the reaction mixture at the pressure utilized, and is controlled in accordance with well known principles, relating to the formation of undesired byproducts such as acetals and esters. Suitably, this temperature is between about 0° C. and 100° C. For $\alpha,\beta$-unsaturated aldehydes, a similar temperature range is useful, that between about 15° C. to 35° C. being preferred, however. The pressure used is preferably ambient pressure, but an elevated pressure of up to about 100 pounds per square inch gauge, for example, is useful in situations where temperatures higher than the boiling point of the reaction mixture is desired. Caution must be exercised to be certain the explosive limits of the mixture at elevated pressures are not exceeded, however.

Small amounts of catalysts are useful, even trace amounts giving good results. The preferred quantity of catalyst, by weight of the aldehyde, is from about 0.01% to 10%. Between about 0.005% and 15% catalyst, based upon the weight of the aldehyde being oxidized, is useful, however. Excessive amounts of catalyst confer no particular benefit. The amount of catalyst as specified above is the combined weight of the catalyst components consisting of the non-chelate organo-cobalt compound and the organocobalt compound. Other oxidation catalysts may be added if desired, and utilization may be made of actinic light preferably with polymerization inhibitors being present, however, when a material susceptible to polymerization by actinic "catalysis" is present.

*Example 1*

Freshly distilled methacrolein in the amount of 15.1 g. was mixed with 47.5 g. of benzene and charged to a cylindrical glass reactor equipped with a fritted glass bottom for admission of gas. The reactor was also equipped with a stirring blade and motor for efficient agitation. Sulphur (0.2 g.) as a polymerization inhibitor was added together with 0.15 g. cobaltacetylacetonate and 1.37 g. of cobaltnaphthenate. The outlet of the reaction vessel was equipped with an ice-water cooled condenser. The temperature of the reactor was adjusted to 30° C. with a water bath, stirring was begun and oxygen was admitted through the fritted glass bottom at 8.6 ml. per min. After about 2 hours and 30 minutes the temperature rose to 38° C. Ice was added to the cooling bath to reduce the temperature to 30° C. where it was maintained for the remainder of the reaction period. The reaction was continued for an additional 3 hours and 10 minutes after which time the crude product was analyzed by infrared absorption. The yield of methacrylic acid was 28%, the selectivity was about 85% and the conversion was about 33%.

*Example 2*

The reaction was conducted exactly as Example 1 except that 0.3 gram of cobaltacetylacetonate were employed as catalyst instead of the mixture of cobaltacetylacetonate and cobaltnaphthenate used before. The yield of methacrylic acid was 17%. The selectivity was about 84% and the conversion was only about 20%. Whenever cobalt acetylacetonate was added to the mixture of solvent and methacrolein, either before or after the addition of the other catalyst component, or in the absence of the other component, a solid material was found to be present.

*Example 3*

The reaction was conducted exactly as the preceding examples except that 2.7 grams of cobaltnaphthenate only were added as catalyst. No methacrylic acid was detected in the product.

*Example 4*

No sulfur was added to this reaction and the catalyst was a mixture containing 0.15 gram of cobaltacetylacetonate and 0.31 gram of cobaltnaphthenate. The yield of methacrylic acid was about 34%, the selectivity about 98% and the conversion was about 35%.

*Example 5*

About 48 g. (55 ml.) of toluene, 13.4 g. methacrolein and 1.52 g. of catalyst (0.15 g. cobalt acetylacetonate and 1.37 g. cobaltnaphthenate) were charged to the reactor (no sulfur was used). Oxygen was passed through the reactor as in the above examples. Approximately 19% of the methacrolein was converted to methacrylic acid. In this and the following examples, the weight and kind of solvent were the only major variations made from the steps of Example 1. The volume of solvent was the same as for Example 1.

*Example 6*

About 87 g. (55 ml.) of carbon tetrachloride were used as solvent. Thirty-one percent of the methacrolein present was converted to methacrylic acid.

*Example 7*

When 55 ml. of mixed xylenes were used as solvent, 23% of the methacrolein present was converted to methacrylic acid.

*Example 8*

When o-xylene was the solvent 29% of the methacrolein present was converted to methacrylic acid.

*Example 9*

When p-xylene was used as solvent, 35% of the methacrolein charged was converted to methacrylic acid.

For the purpose of the foregoing examples, yield, selectivity and conversion are defined as follows:

$$\text{Yield} = \frac{\text{gram moles of methacrylic acid produced}}{\text{gram moles of methacrolein charged}} \times 100$$

$$\text{Selectivity} = \frac{\text{gram moles of methacrylic acid produced}}{\text{gram moles of methacrolein reacted}} \times 100$$

$$\text{Conversion} = \frac{\text{gram moles methacrolein reacted}}{\text{gram moles methacrolein charged}} \times 100$$

The "induction period" in the above examples varied somewhat, usually being one to one and one-half hours before its termination was indicated by a rise in temperature and a sudden absorption of oxygen. The total time of reaction for each of the examples was 5 hrs. 40 mins.; thus where the induction period was shorter, the actual time of reaction may have been longer than in cases where the induction period was relatively long. The analyses were made by infrared spectra, since chemical titration to determine the amount of acid present often gives a distorted picture due to the presence of degradation products such as formic acid and other organic acids. The infrared spectrometer was a Baird-Atomic, Model 455, and absorptivity was established from pure samples of methacrylic acid at the methacrylic acid absorption maxima near 8.24 and 8.32 microns.

Uses for the carboxylic acids produced according to the invention are well known. Some of the products are polymerizable by way of the olefinic unsaturation to form synthetic resins, either as the acids themselves or after the formation of esters with monohydric or polyhydric alcohols. The product carboxylic acids may be reacted to form esters, useful as solvents and in some cases having useful olfactory properties. Amides may be formed from the acids, in the form of polyamides in the instances where a polycarboxylic acid is the product. Certain of the acids are also microbiocidal, for instance fungicidal, compounds.

We claim:

1. In a process of oxidizing an aldehyde in an organic solvent to its corresponding carboxylic acid by intimately contacting said aldehyde with oxygen gas, the improvement of the steps of commingling said aldehyde and at least about 0.005%, based on the weight of said aldehyde, of the catalyst having as components thereof (1) a cobalt salt of naphthenic acid and (2) a cobalt chelate of a β-diketone having up to about 23 carbon atoms and having the formula:

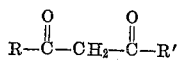

wherein R and R' are hydrocarbon radicals, the ratio of (1) to (2) being between about 100 to 1 and 1 to 100, and recovering the products of reaction.

2. The process of claim 1 in which said aldehyde is an olefinically α,β-unsaturated aldehyde.

3. The process of claim 1 in which said aldehyde is selected from the group consisting of acrolein, methacrolein, crotonaldehyde, and cinnamaldehyde, and said β-diketone is acetylacetone.

4. The process of claim 1 in which the weight ratio of component (1) to component (2) is between about 1 to 10 and 10 to 1.

5. The process of claim 4 in which said aldehyde is acrolein.

6. The process of claim 4 in which said aldehyde is methacrolein.

References Cited in the file of this patent

UNITED STATES PATENTS

| | | |
|---|---|---|
| 2,153,406 | Bauer | Apr. 4, 1939 |
| 2,828,337 | Whitaker | Mar. 25, 1958 |
| 2,833,816 | Saffer et al. | May 6, 1958 |